United States Patent
Liikanen et al.

(10) Patent No.: US 7,397,622 B1
(45) Date of Patent: Jul. 8, 2008

(54) METHOD AND APPARATUS FOR IMPROVING SERVO STABILITY IN READ HEADS WHILE WRITING

(75) Inventors: Bruce A. Liikanen, Berthoud, CO (US); John W. Van Laanen, Louisville, CO (US); Tie Jun Yie, Longmont, CO (US); David L. Rewerts, Longmont, CO (US); Larry Roohr, Boulder, CO (US)

(73) Assignee: Maxtor Corporation, Scotts Valley, CA (US)

(*) Notice: Subject to any disclaimer, the term of this patent is extended or adjusted under 35 U.S.C. 154(b) by 0 days.

(21) Appl. No.: 09/570,490

(22) Filed: May 12, 2000

(51) Int. Cl.
*G11B 5/03* (2006.01)
(52) U.S. Cl. .......................................... 360/66
(58) Field of Classification Search ................ 360/66, 360/67, 25, 31, 53, 51, 46, 77.04; 369/47.1, 369/47.3, 47.49, 47.53; 327/553
See application file for complete search history.

(56) References Cited

U.S. PATENT DOCUMENTS

| | | | | |
|---|---|---|---|---|
| 5,305,157 A | * | 4/1994 | Wada et al. | 360/53 |
| 5,463,603 A | * | 10/1995 | Petersen | 360/67 |
| 5,523,898 A | * | 6/1996 | Jove et al. | 360/66 |
| 6,122,127 A | * | 9/2000 | Flinsbaugh | 360/66 |
| 6,172,832 B1 | * | 1/2001 | Dovek et al. | 360/66 |
| 6,356,404 B1 | * | 3/2002 | Nguyen | 360/66 |

* cited by examiner

*Primary Examiner*—Joseph Feild
*Assistant Examiner*—Daniell L Negrón
(74) *Attorney, Agent, or Firm*—Westman, Champlin & Kelly, P.A.

(57) ABSTRACT

A method and apparatus for improving servo stability in read heads while writing is disclosed. In one embodiment, a magnetic storage device includes a disk surface and a transducer. The disk surface has servo information and user data stored thereon. The transducer includes a read head and a write head. The read head is operable to read servo information and user data from the disk surface. The write head is operable to write user data onto the disk surface. The read head is biased by a first bias current when reading user data and servo information from the disk surface during a read operation. The read head is biased by a second bias current when reading servo information from the disk surface during a write operation. The second bias current, which is different from the first bias current, is selected to increase servo stability in the read head when writing. Further, the write current may also be modified from a standard value in order to increase servo stability in the read head while writing.

38 Claims, 3 Drawing Sheets

METHOD AND APPARATUS FOR IMPROVING SERVO STABILITY IN READ HEADS WHILE WRITING

FIELD OF THE INVENTION

The present invention relates to magnetic storage devices and, more particularly, to magnetic storage devices which employ transducers having an inductive write head and a magneto-resistive (MR) or giant magneto-resistive (GMR) read head.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is an air-bearing surface view of a transducer 20. As shown in FIG. 2, the transducer 20 includes functionally separate write and read heads 40, 42, respectively. More specifically, the transducer 20 typically includes a write element 200, a write gap 204, a first shield 208, a second shield 212, a read gap 216 and a magneto-resistive read element (or giant magneto-resistive read element) 220.

FIG. 3 is a simplified top view of a disk 12 illustrating a conventional embedded servo system (also known as sectored servo system). As illustrated in FIG. 3, the disk 12 includes a plurality of concentric tracks 44 for storing data on the surface of the disk. Although FIG. 3 only shows a relatively small number of tracks (i.e., 8), for ease of illustration, it should be appreciated that typically many thousands of tracks are included on the surface of a single disk 12.

Each track 44 is divided into a plurality of data sectors 46 and a plurality of servo sectors 48. The servo sectors 48 in each track are radially aligned with servo sectors 48 in the other tracks, thereby forming servo wedges 50 which extend radially across the disk 12. The servo sectors 48 are used to position the read head 42 and write head 40 associated with each disk 12 during operation of the disk drive 10.

In general, the transducer 20 has three modes of operation. First, the transducer 20 may read servo data located within servo sectors 48 using the read head 42. Second, the transducer 20 may read customer data located within data sectors 46 using the read head 42. Third, the transducer 20 may write customer data into data sectors 46 using the write head 40.

As is well understood by those skilled in the art, the first mode of operation of the transducer 20 (i.e., reading servo data) is used in conjunction with the second and third modes of operation (i.e., reading customer data and writing customer data, respectively). Specifically, the servo data must be read in connection with performing the operations of reading and writing customer data so that the read head 42 and the write head 40 are properly positioned over the disk surface (i.e., over the correct track 44 and data sector 46) when such operations are performed.

More specifically, when performing a read operation, servo data located in servo sectors 48 is read by read head 42 to properly position the read head 42 both radially and circumferentially over the disk 12. Customer data is then read from one or more data sectors 46 using the read head 42. While customer data is being read from the disk 12, the read head 42 is unable to make adjustments in its position over the disk 12. Accordingly, servo data located in servo sectors 48 is periodically read to make positional adjustments of the read head 42.

Similarly, when performing a write operation, servo data located in servo sectors 48 is read by read head 42 to properly position the write head 40 both radially and circumferentially over the disk 12. Customer data is then written to one or more data sectors 46 using the write head 40. While customer data is being written onto the disk 12, the read head is unable to make adjustments in the position of the write head 40 over the disk 12. Accordingly, servo data located in servo sectors 48 is periodically read by the read head 42 to make positional adjustments of the write head 40. It should be noted, however, that the write current to the write head 42 is turned off prior to the read head 42 reading servo data.

As is understood by those skilled in the art, the read head 42 and write head 40 are spaced apart from one another by a small distance in a downtrack direction (see FIG. 2). (In some cases, the read head 42 and write head 40 may also be spaced apart from one another by a small distance in a cross-track direction.) Because of this spacing, the read head 42 and write head 40 are generally unable to follow the same path over the disk 12. The amount by which the paths of the read and write heads 42, 40 differ (i.e., the skew) depends upon the radial position of the transducer 20 over the disk 12. Accordingly, the track over which the read head 42 is positioned will generally be different from the track over which the write head 40 is positioned. Thus, when performing a write operation, the position of the transducer 20 is adjusted after reading servo data from a servo sector 48 to properly position the write head 40 over the appropriate data track 44. This adjustment is known as "microjogging."

Information is capable of being written onto or read from the surface of the disk 12 because the disk 12 is coated with a magnetic material that is capable of changing its magnetic orientation in response to an applied magnetic field. Writing is performed by delivering a write signal having a variable current to the write head 40 while the write head 40 is held close to the track 44 and data sector 46 to which such data is to be written. The write signal creates a variable magnetic field at a gap portion of the write head 40 that induces magnetic polarity transitions onto the surface of the disk 12 which constitute the data being stored.

Reading is performed by sensing the magnetic polarity transitions on the rotating track with the read head 42. As the disk 12 spins below the read head 42, the magnetic polarity transitions on the track present a varying magnetic field to the read head 42. The read head 42 converts the varying magnetic field into an analog read signal that is then delivered to a read channel (not shown) for appropriate processing. The read channel converts the analog read signal into a properly-timed digital signal that can be recognized by a host computer system (not shown).

More specifically, a read head 42 typically has an MR read element (or a GMR read element), which includes a strip of magneto-resistive material that is generally held between two magnetic shields. The resistance of the magneto-resistive material varies almost linearly with applied magnetic field. During a read operation, the MR strip is held near a desired track, with the varying magnetic field caused by the magnetic transitions on the track. A constant DC current (known as a bias current) is passed through the strip resulting in a variable voltage across the strip. By Ohm's law (i.e., V=IR), the variable voltage is proportional to the varying resistance of the MR strip and, hence, is representative of the data stored within the desired track. The variable voltage signal (which is the analog read signal) is then processed and converted to digital form for use by the host computer.

One problem with many conventional disk drives is that they suffer from a phenomenon known as write-induced instabilities. That is, when performing a write operation, the magnetic flux generated by the write head 40 to record information onto the disk surface has an affect on the read head 42 (after the write current is turned off) which prevents the read head 42 from properly reading servo data from the servo sectors 48. Specifically, during a write operation, after the write current to the write head 40 has been turned off and the read head 42 is being used to read servo data to properly position the write head 40, the read head 42 may not be able to properly read servo data from servo sectors 48.

More specifically, an instability is created in the domains of the read head 42 (e.g., in one or both of the shields, permanent magnet or MR/GMR element) due to the flux generated by the write current that is applied to the write head 40 while writing customer data onto the disk 12. This instability causes a large perturbation for a short period of time (e.g., 1-2 microseconds). Accordingly, the read signal generated when reading servo data from a servo sector 48, immediately after writing customer data to a data sector 46, is corrupted. Thus, the write head 40 may be positioned in an erroneous location over the surface of the disk 12 or the read head 42 must be permitted to re-read the servo data (by the disk spinning an entire revolution) before resuming the write operation. As will be appreciated, the performance of the drive, which is required to write information with high speed and high accuracy, can be significantly diminished by write-induced instability errors.

In order to ensure that disk drives 10 having transducers 20 that suffered from write-induced instabilities were not shipped to consumers, several tests were developed. Many of these tests require a drive to be manufactured before testing occurs. Accordingly, when a drive fails one of these tests, it is required to be discarded or reassembled (with new read head (s)), resulting in reduced manufacturing yield and manufacturing throughput, as well as, increased manufacturing costs.

For example, one of these tests is known as a WIPE test (write-induced position error test). In the WIPE test, many write operations are performed on each disk surface and every time servo data is determined to be corrupted, such errors are recorded on a head-by-head basis. The instability error rate for each head of a drive is then compared to a target instability error rate to determine whether a drive is within acceptable parameters to be sold to consumer. Again, if a drive fails the test, it is either discarded or disassembled, resulting in a loss of time and money for a disk drive manufacturer.

It would be advantageous to provide a method and apparatus for improving servo stability in MR heads while writing. More specifically, it would be advantageous to provide a method and apparatus for reducing instances of write-induced instabilities, so that manufacturing yields may be increased, manufacturing throughput can be increased and manufacturing costs can be decreased.

SUMMARY OF THE INVENTION

The present invention is designed to overcome the aforementioned problems and meet the aforementioned, and other, needs.

A method and apparatus for improving servo stability in read heads while writing is provided. The read head is biased by a first bias current (or standard bias current) when the disk drive is performing read operations (i.e., reading user data and reading servo data) and biased by a second bias current (or modified bias current) when the disk drive is performing write operations (i.e., writing user data and reading servo data). The second bias current is selected to reduce write-induced instabilities and may be greater than or less than the first bias current. (It generally will be less than the first bias current).

In disk drives having more than one read and write head, the standard bias current and modified bias current for each read head are preferably determined on a head-by-head basis. In addition, the standard bias current and modified bias current for each read head are also preferably determined on a zone-by-zone basis.

The relationship between the standard bias current and modified bias current may be a fixed difference, may be determined on a trial-and-error basis or may be determined using a genetic algorithm. Further, the write current may also be modified from a standard value in order to increase servo stability in read heads while writing.

Other objects, features, aspects and advantages of the invention will be apparent from the following specification taken in conjunction with the following drawings.

DETAILED DESCRIPTION OF THE PREFERRED EMBODIMENT

Figure 1:
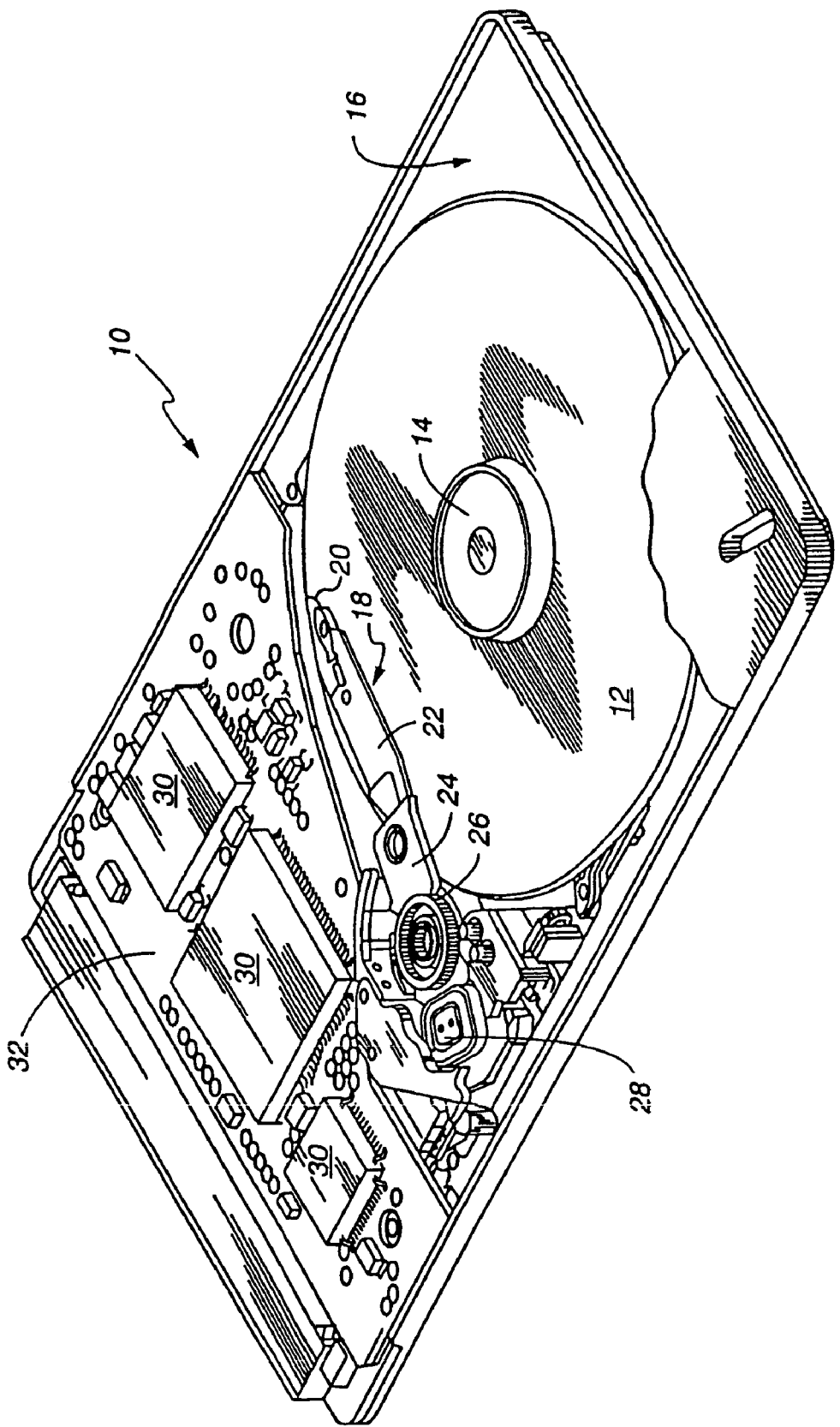
FIG. 1 is a perspective view illustrating certain components of a conventional disk drive.
Figure 2:
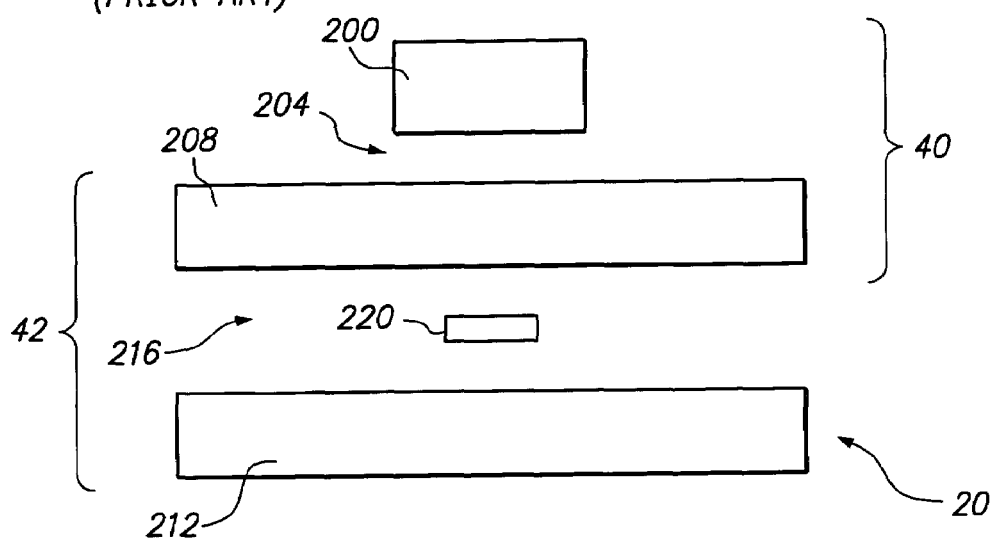
FIG. 2 is an illustration of an air-bearing surface view of a transducer showing its read head and write head.
Figure 3:
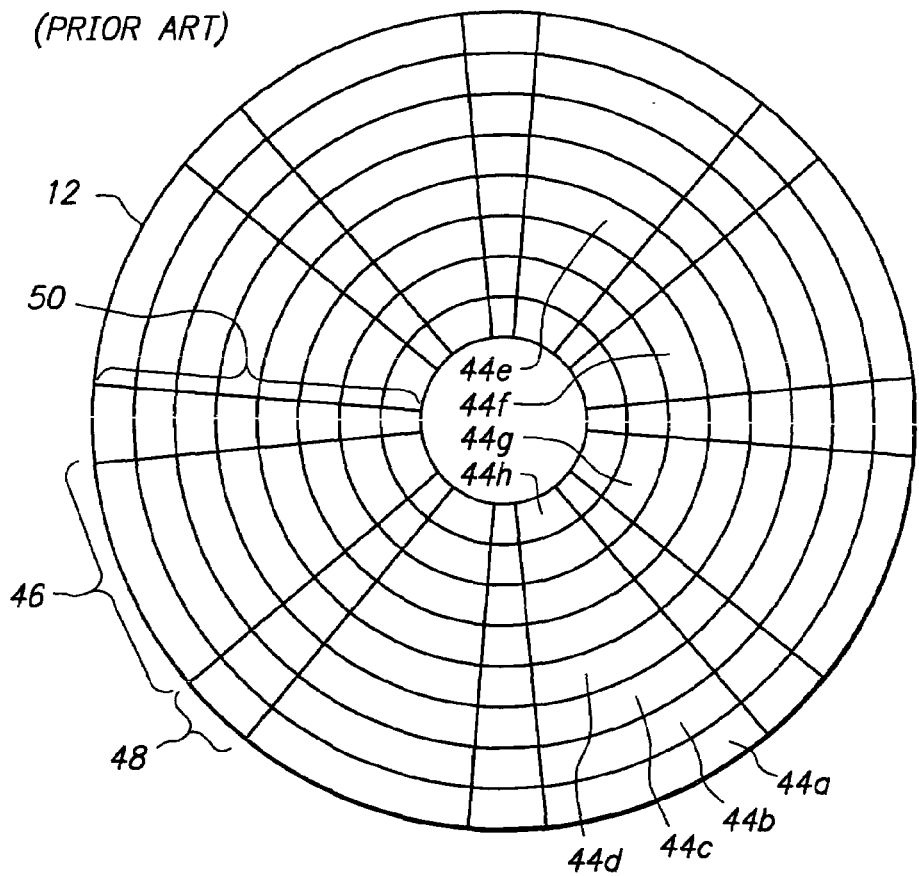
FIG. 3 is an illustration of a disk surface having servo information thereon, to be used in conjunction with a sectored servo system; and, FIG. 4 is a simplified flow diagram illustrating one manner of implementing the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The inventors of the present invention have recognized that write-induced instabilities can often be substantially reduced or eliminated by changing (i.e., reducing or increasing) the read bias current in the read head. The inventors of the present invention have also recognized that read bias current is generally optimized for reading customer data, so that read error rates are minimized. Accordingly, changing the read bias current to mitigate write-induced instabilities would likely degrade the read error rate, which is generally undesirable and unacceptable. The inventors of the present invention have further recognized that servo information is generally recorded at a lower density than customer data and, therefore, a reduction in read bias current is not likely to increase read error rates when reading servo data. Accordingly, the inventors of the present invention have developed a method and apparatus for improving servo stability in MR heads while performing a write operation (i.e., writing customer data with a write head into a data sector and reading servo information with a read head from a servo sector) by changing (i.e., reducing or increasing) read bias current only when performing a write operation. The particulars of the present invention will now be described.

As mentioned above, the present invention uses two different read bias currents, one during a read operation (i.e., reading servo data with read head and reading customer data with read head) and one during a write operation (i.e., reading servo data with read head and writing customer data with write head). The read bias current used during a read operation preferably is optimized to read customer data using the read head, as in prior disk drive systems, so that read error rates are minimized.

In contrast, the read bias current used during a write operation is optimized to minimize the error rate of, and/or maximize the quality of, servo data read by the read head while performing a write operation. Preferably, the optimum read bias current for a write operation is determined separately for each read head.

There are many methods of selecting the read bias current used during the write operation. In a first (crude) method (where the read bias current for a write operation is not determined separately for each head), the read bias current used during write operations may be changed by some fixed amount (either increased or decreased) relative to the read bias current used during read operations. If the bias current was to be decreased, the fixed reduction might be, for example, one milliamp. For example, if an optimized read bias current for reading customer data using a particular read head is 6 milliamps, the read bias current used during write operations would be 5 milliamps. For a different read head in the same disk drive which had an optimized read bias current of 3 milliamps for reading customer data, the read bias current used during write operations would be 2 milliamps. The fixed amount may be determined on a trial-and-error basis.

Similarly, if the read bias current was to be increased, the fixed increase might be, for example, 2 milliamps. For example, if an optimized read bias current for reading customer data using a particular read head is 6 milliamps, the read bias current used during write operations would be 8 milliamps. For a different read head in the same disk drive which had a read bias current of 3 milliamps for reading customer data, the read bias current used during write operations would be 5 milliamps. Again, the fixed amount may be determined on a trial-and-error basis.

A second method of selecting the read bias current used for a particular read head during a write operation is to optimize read bias current based upon a read head's write-induced instability rate. For example, a diagnostic test may be used to determine a write-induced instability rate of a read head for different values of read bias current. The read bias current would be selected for a particular head when a minimum or acceptable write-induced instability rate had been determined. In one case, a linear search could be performed for different read bias currents used during a write operation. In another case, an exhaustive search could be performed.

A third method of selecting the read bias current used for a particular read head during a write operation is to use a genetic algorithm. In such case, the read bias current for write operations and the write current would both be selected to minimize write-induced instabilities using the genetic algorithm. In present-day disk drive systems, write current is optimized to yield an optimally low bit error rate (BER). However, the inventors of the present invention have determined that the optimized write current, in certain situations, may increase the likelihood of write-induced instabilities. Accordingly, the write current may be varied from its optimized value (with respect to BER), so long as an acceptable BER is achieved.

More specifically, a genetic algorithm, as used in disk drive optimization, is an algorithm in which each register setting (such as read bias and write current) in a group of channel and/or preamplifier register settings (wherein the group of register settings comprises an individual) is treated as a gene. In nature, genes determine the makeup of an individual and the ability of that individual to survive in its environment. In a disk drive, the bit-error-rate (BER) is used as the environment in which an individual has to survive. Since the BER is a measurable value, it can be used to measure the fitness or health of an individual.

In application, first, a base population of individuals is created (using a seed, for example). Each of these individuals is made up of a group of channel and/or preamplifier register settings, wherein each setting comprises a gene. Next, each individual within the population is then measured to determine its fitness in the environment (BER). The individuals with the best fitness are allowed to carry their genes (or register settings) in some fashion to the next generation. The next generation then gets tested for fitness and again the best individuals are allowed to carry their genes onto a third generation. This process can go on for many generations. Eventually, the best (or an acceptable) individual (i.e., group of channel and/or preamplifier register settings) is selected for the particular head and zone in question.

For purposes of the present invention, the genetic algorithm could be modified such that each individual is measured for write instabilities. The number of write instabilities could be used to affect the fitness of an individual (in addition to BER). Thus, an individual (i.e., group of channel and/or preamplifier register settings, which include read bias current and write current) may be selected with an acceptable BER and an acceptable number of instabilities.

U.S. Pat. No. 5,781,699 entitled "Method for Optimization of Channel Parameters in a Data Storage Device," which is assigned to the current assignee of the present invention, describes (among other things) a genetic algorithm for tuning channel parameters of a data storage device and is specifically incorporated herein by reference.

A fourth method of selecting a read bias current used for a particular read head along with a write current used for a particular write head uses a weighted function (using servo data error rate performance and write-induced instability performance) to select appropriate values. Specifically, first, a range of read bias currents are tested for servo data error rate performance. Next, the same range of read bias currents are tested for write-induced instability performance. A value for the read bias current is selected (from the range of read bias currents tested) which, first, meets servo data error rate performance requirements and, second, meets write-induced instability performance requirements.

The write current is selected in a similar manner. Specifically, first, a range of write currents are tested for BER performance. Next, the same range of write currents are tested for write-induced instability performance. A value for the write current is selected (from the range of write currents tested) which, first, meets BER performance requirements and, second, meets write-induced instability performance requirements.

Figure 4:
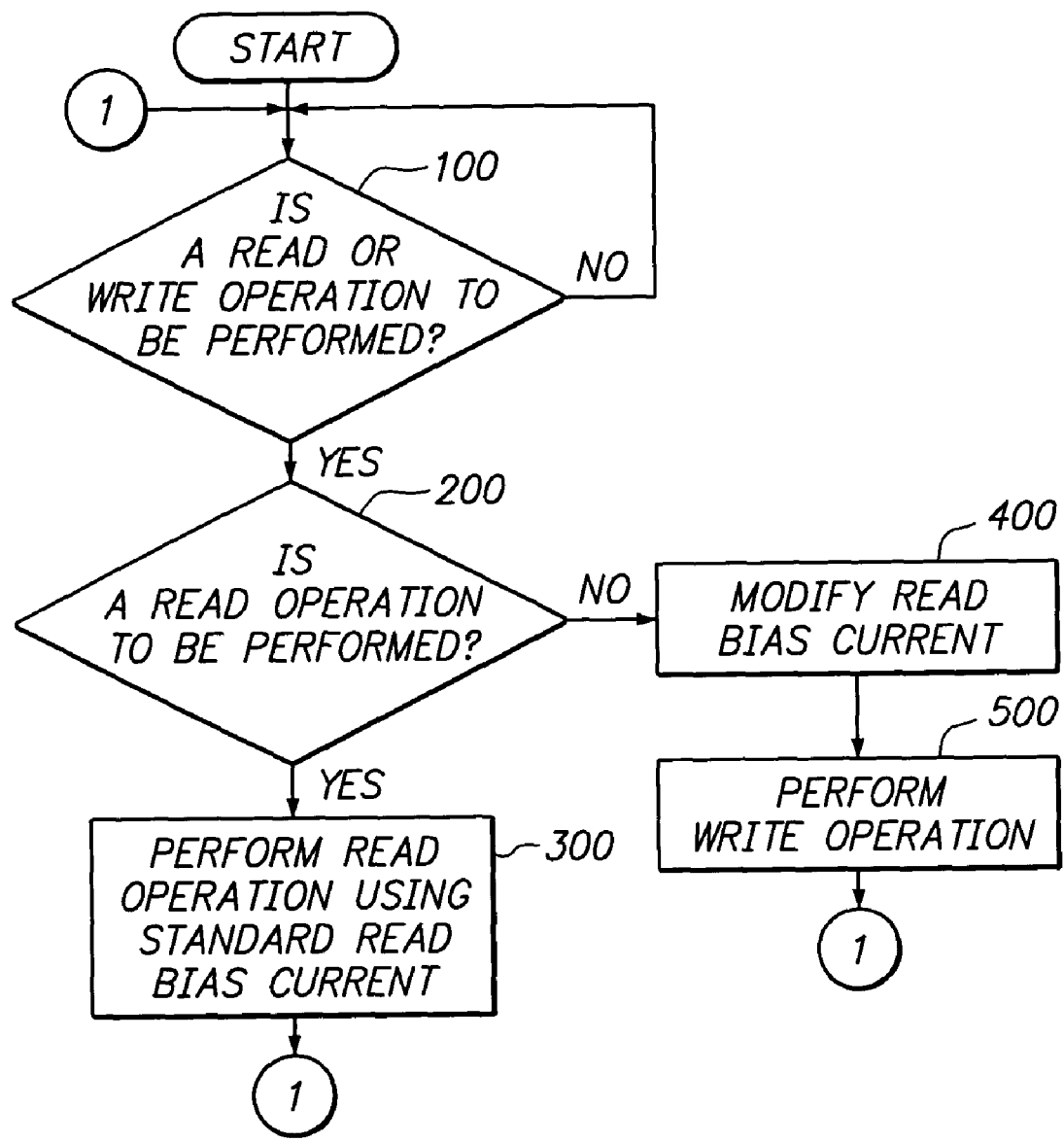

FIG. 4 is a simplified flow diagram illustrating one method of implementing the present invention. It should be understood that there are many other ways of implementing the present invention and FIG. 4 shows one of a number of possibilities.

Referring now to FIG. 4, a determination is made whether a read or write operation is to be performed (step 100). If a read or write operation is not to be performed, the question in step 100 is asked again. If a read or write operation is to be performed in step 100, a determination is made whether a read operation is to be performed (step 200).

If the answer to the question in step 200 is that a read operation is to be performed, a read operation is then performed using a standard read bias current (or first read bias current). If the answer to the question in step 200 is negative, then one knows that a write operation is to be performed. Accordingly, in order to improve servo stability while writing, the read bias current is modified (step 400). Specifically, the read bias current is reduced (e.g., using one of the aforementioned methods of selecting the read bias current mentioned above). A write operation is then performed (step 500), using the modified read bias current (or second read bias current).

After a read operation is performed in step 300 or a write operation is performed in step 500, a determination is made as to whether a next read or write operation is to be performed in step 100.

Implementation of the invention naturally flows into existing firmware because of the microjogging that must occur to properly position the transducer 20 during reading and writing. As will be understood by those skilled in the art, a drive never switches between writing customer data and reading customer data without an intervening seek operation. More specifically, when performing a write operation, a seek routine is performed to a write microjog track and when performing a read operation, a seek routine is performed to a read microjog track. Thus, whenever a seek routine is performed, the read bias current may be appropriately set for performing a write operation or a read operation.

In present-day disk drives, the write current is optimized for each write head for each data zone. A zone may include a group of tracks on the disk 12 (e.g., zone 1 could be tracks 44a and 44b; zone 2 could be tracks 44c and 44d; etc.). Similarly, when implementing the present invention, the read bias current for performing a write operation may be optimized for each read head for each data zone.

One of the most appealing aspects of the present invention is that it may be implemented as a firmware-only modification. That is, the present invention may be implemented in firmware without having to modify any structural components of the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A magnetic storage device comprising:
    a disk surface having servo information and user data stored thereon;
    a transducer including a read head and a write head, said read head operable to read servo information and user data from said disk surface, said write head operable to write user data onto said disk surface, said read head being biased by a first bias current when performing a read operation,
    said read head being biased by a second bias current when reading servo information from said disk surface in order to position the write head relative to said disk surface as part of a write operation, wherein the second bias current is different from the first bias current and wherein both the first bias current and the second bias current are DC currents.

2. The magnetic storage device of claim 1 wherein said read head is biased by said first bias current when reading servo information during a read operation.

3. The magnetic storage device of claim 1 wherein said second bias current is selected so that write-induced instabilities may be are reduced as compared to using said first bias current.

4. The magnetic storage device of claim 1 wherein said second bias current is less than said first bias current.

5. The magnetic storage device of claim 1 wherein said second bias current is greater than said first bias current.

6. The magnetic storage device of claim 1 further including:
    at least a second transducer having a second read head and a second write head, said second read head operable to read servo information and user data from a second disk surface, said second write head operable to write user data onto said second disk surface, said second read head being biased by a third bias current when performing a read operation associated with said second disk surface,
    said second read head being biased by a fourth bias current when reading servo information from said second disk surface as part of a write operation for positioning the second write head relative to said second disk surface, wherein the fourth bias current is different from the second bias current and the third bias current and wherein both the third bias current and the fourth bias current are DC currents.

7. The magnetic storage device of claim 6 wherein said first, second, third and fourth bias currents are determined on a head-by-head basis for said first and second read heads.

8. The magnetic storage device of claim 7 wherein said first, second, third and fourth bias currents are determined on a zone-by-zone basis for each of said first and second read heads.

9. The magnetic storage device of claim 6 wherein the difference between the first bias current and the second bias current is equal to the difference between the third bias current and the fourth bias current.

10. The magnetic storage device of claim 1 wherein said write current is selected to reduce write-induced instabilities.

11. The magnetic storage device of claim 1 wherein the bias current is changed from the first bias current to the second bias current during a seek operation when switching from a read to a write operation.

12. The magnetic storage device of claim 1 wherein said second bias current is determined by a genetic algorithm.

13. The magnetic storage device of claim 1 wherein the second bias current is selected by testing for an acceptable write-induced instability rate.

14. A method for improving servo stability in a magnetic storage device comprising the steps of:
providing a disk surface having servo information and user data stored thereon;
providing a transducer including a read head and a write head, said read head operable to read servo information and user data from said disk surface, said write head operable to write user data onto said disk surface;
biasing said read head by a first bias current when reading user data from; and,
biasing said read head by a second bias current when reading servo information from said disk surface as part of a write operation in order to position the write head relative to said disk surface, wherein said second bias current is different from said first bias current and wherein both the first bias current and the second bias current are DC currents.

15. The method of claim 14 wherein said read head is biased by said first bias current when reading servo information during a read operation.

16. The method of claim 14 wherein said second bias current is selected so that write-induced instabilities are reduced as compared to using said first bias current.

17. The method of claim 14 wherein said second bias current is less than said first bias current.

18. The method of claim 14 wherein said second bias current is greater than said first bias current.

19. The method of claim 15 further including the steps of:
providing at least a second transducer having a second read head and a second write head, said second read head operable to read servo information and user data from a second disk surface, said second write head operable to write user data onto said second disk surface;
biasing said second read head by a third bias current when performing a read operation on said second disk surface;
biasing said second read head by a fourth bias current when reading servo information from said second disk surface as part of a write operation in order to position the second write head relative to said second disk surface, wherein said fourth bias current is different from said second bias current and said third bias current and wherein both said third bias current and said fourth bias current are DC currents.

20. The method of claim 19 wherein said first, second, third and fourth bias currents are determined on a head-by-head basis for said first and second read heads.

21. The method claim 20 wherein said first, second, third and fourth bias currents are determined on a zone-by-zone basis for each of said first and second read heads.

22. The method of claim 19 wherein the difference between the first bias current and the second bias current is equal to the difference between the third bias current and the fourth bias current.

23. The method claim 14 wherein said write current is selected to reduce write-induced instabilities.

24. The method of claim 14 wherein the bias current is changed from the first bias current to the second bias current during a seek operation when switching from a read to a write operation.

25. The method of claim 14 wherein said second bias current is determined by a genetic algorithm.

26. The method of claim 14 wherein the second bias current is selected by testing for an acceptable write-induced instability rate.

27. A method for improving servo stability in a magnetic storage device comprising the steps of:
providing a disk surface having servo information and user data stored thereon;
providing a transducer including a read head and a write head, said read head operable to read servo information and user data from said disk surface, said write head operable to write user data onto said disk surface, wherein a read operation includes reading servo information and reading user data from said disk surface and wherein a write operation includes reading servo information from said disk surface and writing user data to said disk surface;
biasing said read head by a first bias current when reading servo information as part of performing a read operation; and,
biasing said read head by a second bias current when reading servo information from said disk surface as part of a write operation, wherein said second bias current is different from said first bias current and wherein both the first bias current and the second bias current are DC currents.

28. The method of claim 27 further including:
biasing said read head by said first bias current when reading user data from the disk surface.

29. The method of claim 27 wherein said second bias current is less than said first bias current.

30. The method of claim 27 wherein said second bias current is greater than said first bias current.

31. The method of claim 27 wherein said second bias current is determined by a genetic algorithm.

32. A magnetic storage device comprising:
a disk surface having servo information and user data stored thereon;
a transducer including a read head and a write head, said read head operable to read servo information and user data from said disk surface, said write head operable to write user data onto said disk surface, said read head being biased by a first bias current when reading user data from said disk surface,
said read head being biased by a second bias current when reading servo information from said disk surface, wherein the second bias current is different from the first bias current and wherein both the first bias current and the second bias current are DC currents.

33. The magnetic storage device of claim 32 wherein said read head is biased by said second bias current when reading servo information during a write operation.

34. The magnetic storage device of claim 33 wherein said read head is biased by said first bias current when reading servo information during a read operation.

35. The magnetic storage device of claim 32 wherein said second bias current is less than said first bias current.

36. The magnetic storage device of claim 32 wherein said second bias current is greater than said first bias current.

37. The magnetic storage device of claim 32 wherein said second bias current is determined by a genetic algorithm.

38. The magnetic storage device of claim 32 wherein said second bias current is determined through use of a weighted function.

* * * * *